(12) United States Patent
Casner et al.

(10) Patent No.: US 8,847,115 B2
(45) Date of Patent: Sep. 30, 2014

(54) CONFIGURABLE WELDING INTERFACE FOR AUTOMATED WELDING APPLICATIONS

(75) Inventors: Bruce Alan Casner, Neenah, WI (US); Daniel Thomas Duckert Casner, Neenah, WI (US)

(73) Assignee: Illinois Tool Works Inc., Glenview, IL (US)

(*) Notice: Subject to any disclaimer, the term of this patent is extended or adjusted under 35 U.S.C. 154(b) by 986 days.

(21) Appl. No.: 12/139,861

(22) Filed: Jun. 16, 2008

(65) Prior Publication Data
US 2009/0313549 A1    Dec. 17, 2009

(51) Int. Cl.
*B23K 9/10* (2006.01)
*B23K 9/095* (2006.01)
*G05B 19/406* (2006.01)

(52) U.S. Cl.
CPC ..... *B23K 9/0953* (2013.01); *G05B 2219/36283* (2013.01); *G05B 2219/34038* (2013.01); *G05B 2219/45135* (2013.01); *G05B 2219/35289* (2013.01); *G05B 19/406* (2013.01)
USPC ........................................ 219/130.5; 219/136

(58) Field of Classification Search
USPC ............... 219/130.5, 132, 136, 137 PS, 137.7
See application file for complete search history.

(56) References Cited

U.S. PATENT DOCUMENTS

| | | | |
|---|---|---|---|
| 6,002,104 A * | 12/1999 | Hsu | ............................ 219/130.5 |
| 6,486,439 B1 | 11/2002 | Spear et al. | |
| 6,624,388 B1 * | 9/2003 | Blankenship et al. | ..... 219/130.5 |
| 6,636,776 B1 | 10/2003 | Barton et al. | |
| 6,788,980 B1 | 9/2004 | Johnson | |
| 6,795,778 B2 | 9/2004 | Dodge et al. | |
| 6,815,640 B1 | 11/2004 | Spear et al. | |
| 2004/0215422 A1 | 10/2004 | Dodge et al. | |
| 2005/0035105 A1 | 2/2005 | Spear et al. | |
| 2005/0258154 A1 * | 11/2005 | Blankenship et al. | ... 219/130.01 |
| 2006/0207980 A1 * | 9/2006 | Jacovetty et al. | .......... 219/130.5 |
| 2007/0262065 A1 * | 11/2007 | Peters et al. | ............... 219/130.5 |

FOREIGN PATENT DOCUMENTS

| | | |
|---|---|---|
| EP | 1702707 A | 9/2006 |
| WO | 02058878 A | 8/2002 |

OTHER PUBLICATIONS

International Search Report and Written Opinion; PCT/US2009/043067; 3 pages.

* cited by examiner

*Primary Examiner* — Henry Yuen
*Assistant Examiner* — Ayub Maye
(74) *Attorney, Agent, or Firm* — Quarles & Brady LLP

(57) ABSTRACT

A welding power source including an embedded web server provides access to an operator at a remote web browser. From the remote web browser, the user is provided access to weld functions, and can selectively choose between weld functions that can be displayed and controlled from the remote web browser. The weld functions that can be accessed include control functions, which allow an operator to activate welding functions such as a jog or purge function; a command function, which allows an operator to provide a command level for a voltage, wire feed speed, or other parameter; and a display function, which provides access for an operator to display welding command and actual feedback values. The operator can also selectively view diagnostic data, including weld state data, error data, and operational voltage and current levels within the power source, such as motor voltage and input voltage levels. After an operator selects parameters to be displayed or controlled from the browser, the selected functions can be stored and recalled as a web page.

28 Claims, 6 Drawing Sheets

CONFIGURABLE WELDING INTERFACE FOR AUTOMATED WELDING APPLICATIONS

FIELD OF THE INVENTION

The present invention is directed to a method and apparatus for configuring welding operations.

BACKGROUND OF THE INVENTION

As the level of automation has increased in mass production facilities, and the speed of welding operations has increased, it has become increasingly important for management personnel to monitor and control welding parameters, processes, and weld cell set-up parameters in a facility. Proper monitoring and control helps to ensure consistent and proper joining of materials, to ensure that completed welds fall within predetermined quality parameters, and to ensure that material waste and operational downtime is avoided.

The need for improved monitoring, moreover, has increased in recent years as welding personnel on the factory floor are frequently inexperienced in welding operations. Often, operators are minimally trained, and cannot properly choose weld parameters, or identify and correct for problems encountered during welding processes and weld set-up. Therefore, it is also important for management personnel to monitor weld and operator performance, and to quickly identify problem operators and areas.

As a result, there are differing levels of monitoring requirements in most facilities. Operators are typically interested only in monitoring very basic command and readout parameters, and in having access to very basic controls. Supervisory personnel, however, need to access large numbers of control parameters, feedback parameters, and weld set-up parameters to properly monitor, control, and troubleshoot welding problems. Moreover, it is important for supervisory personnel to be able to choose the types of data monitored, in order to evaluate and focus in on parameters that might be outside of an appropriate range, or that might provide a basis for analyzing problems in a weld. Monitoring selected controls and parameters simplifies the process for management personnel to analyze the welding process, identify problems, and make corrections before significant down time or waste of material occurs.

Additionally, when problems are encountered with equipment in a weld cell, or with consumables in the cell, it is important for management personnel to identify these failures and to make correction and replacements easily. In an automated environment, it is particularly important to be able to replace a piece of equipment from a cell with an alternative component providing the same feature, and to troubleshoot the removed piece of equipment offline. In these situations, it is important to minimize the amount of time required to set up the system for the alternative component, and to provide a "plug and play" solution to limit downtime. The present invention addresses these issues.

SUMMARY OF THE INVENTION

In one aspect of the invention, a welding power source is provided. The power source includes a power supply, a controller coupled to the power supply to provide weld parameter control signals to the power supply, and an embedded web server in communication with the controller and a remote client browser. The web server is programmed to allow a user accessing the remote client browser to select between a plurality of functions for displaying and controlling weld parameters of the welding power supply, to provide a customized operator interface at the remote client browser for monitoring and controlling the power supply. The user, therefore, can selectively control and display weld parameters at the remote client browser.

In another aspect of the invention, a method for providing a customizable remote interface for a welding power source and associated wire feed system having an embedded web server is provided. In this method, an embedded web server is communicatively coupled to a controller of the welding power source. The server is programmed to provide selective access to weld functions that provide at least one of a display, a control, and a command function of the welding system from a remote browser. Access to the embedded server is provided from the remote web browser, wherein an operator at the remote web browser can selectively choose among the weld functions to customize an interface to display, control and command weld functions from the remote browser. The customized remote interface can then be stored for recall.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
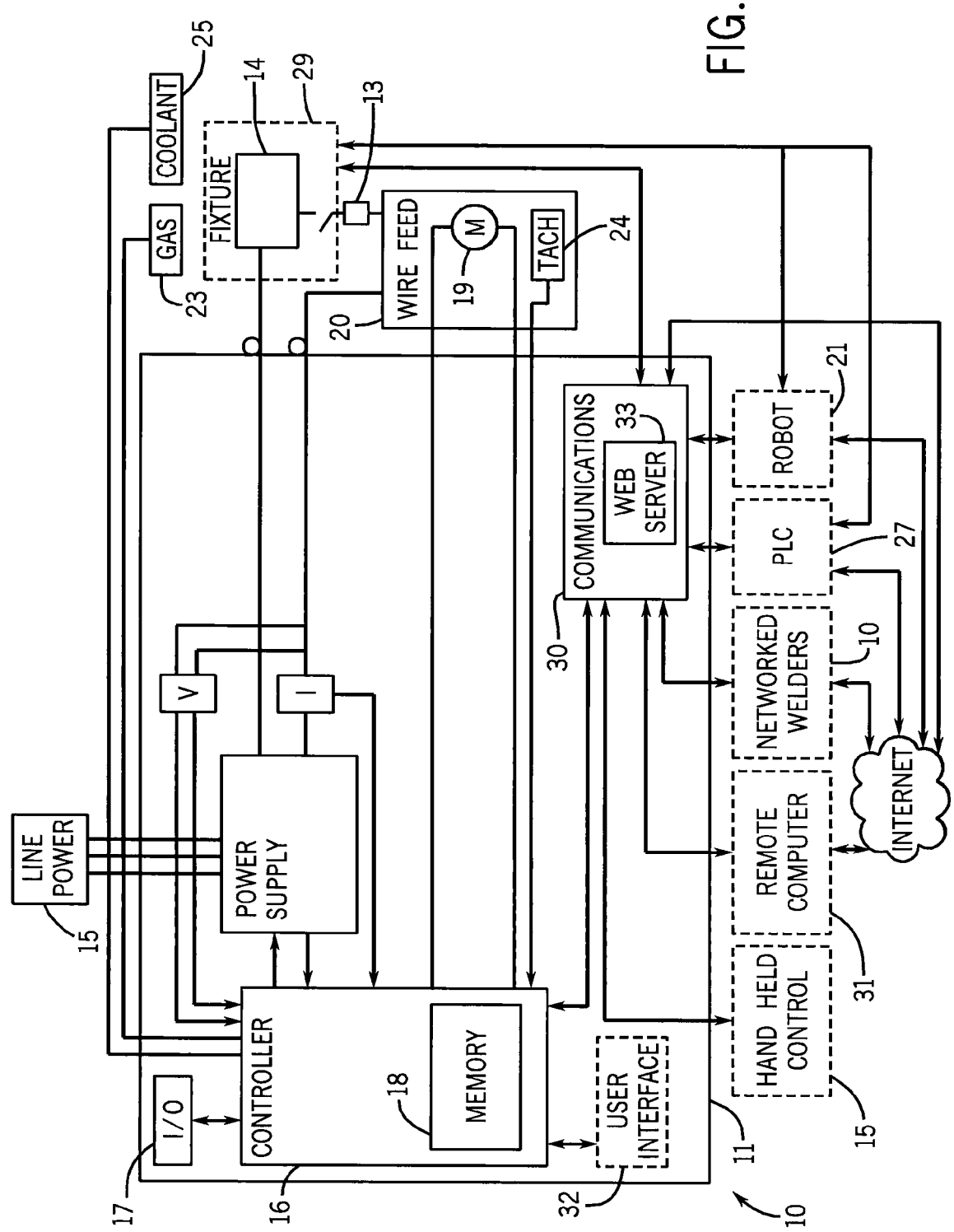
FIG. 1 is a block diagram of a welding system capable of use in the present invention.

Referring now to the Figures and more particularly to FIG. 1, an exemplary welding system 10 for automatic and semi-automatic welding is shown. The welding system 10 includes a housing 11 containing a power supply 12, a controller 16, and a communications system 30 for communicating with external components. These external components can be, for example, the components of a welding cell, including flexible or hard automation components, such as a welding robot 21, a programmable logic controller (PLC) 27, and fixtures 29. Alternatively, or additionally, the external components can include one or more computer or computer network 31, provided in a factory automation system. The communications system 30 can be connected to a series of networked welding systems 10, either directly or through one or more computer 31. Bi-directional communications between the welding system 10 and external devices are preferably provided through an embedded web server 33 in communications system 30.

Figure 2:
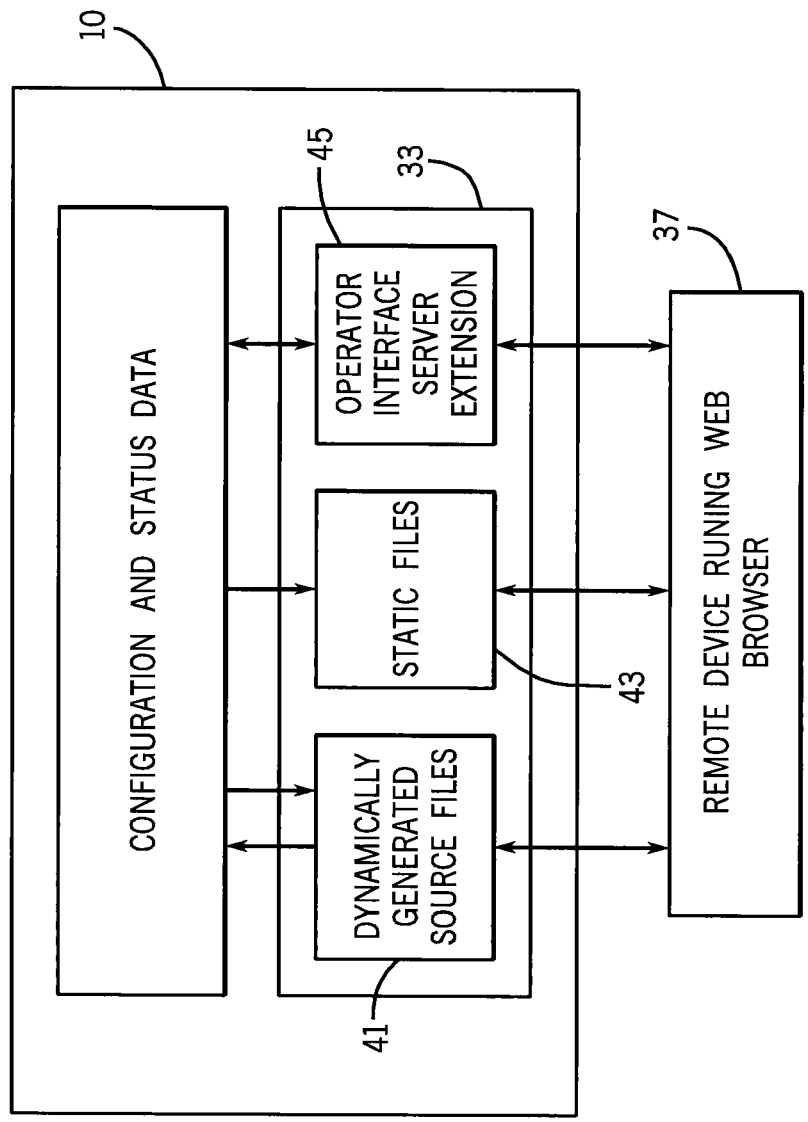
FIG. 2 is a simplified block diagram of the embedded web server in the welding system of FIG. 1, illustrating data storage and flow between an embedded web browser and a remote web browser.

Referring now also to FIG. 2, a simplified block diagram of data storage and communication between the embedded web server 33 and remote client web browsers 37 provided on external devices such as those described above is shown. The screens associated with web server 33 are implemented through a combination of static files 43 stored in memory on the weld system 10, and dynamically generated files 41 created by web server extensions 45 running on the web server 33. The static files 43 include HTML web pages, cascading style sheet documents, image files and JavaScript source code documents. These files provide non-dynamic content for the web interface and a framework for dynamic content. Dynamic, variable data is provided via server extensions 45 executed on the embedded microprocessor in the welder, and is stored in the dynamically generated files 41. This data can include, for example, a weld parameter library of variable data related to the control and performance of weld system 10. The variable data in the weld parameter library can include both input commands and output data, such as, for example, weld command parameters for controlling the power supply 12 and wire feed system 20; digital control commands for activating and deactivating weld system components; digital feedback or state data indicating the state of weld system components; and weld parameter feedback data, indicating the operational state of weld parameters. An exemplary table illustrating the type of variable data that can be stored in a weld parameter library is provided in Table 1 below:

TABLE 1

Weld Command Parameters/Command Functions

Volts
Wire Feed Speed
Frequency
Pulse width
Rise time
Fall time
Torch Travel Speed
Torch Angle
Weld Component Control Commands/Control Functions Gas
Wire Feed Forward
Wire Feed Reverse
Contactor
Program select
Weld Component State Parameters/Diagnostic Parameters Gas On
Wire Feed Forward
Wire Feed Reverse
Wire Stick Detect
Touch sense Detect
Volt Sense Detect
Current Detect TABLE 1-continued Contactor On
Coolant On
Weld Feedback Parameters/Display Parameters Voltage Feedback
Current Feedback
Wire Feed Speed
Gas Pressure
Coolant Pressure
Torch Travel Speed
Torch Angle Variable data, such as the data stored in the weld parameter library, can be combined with the static data 43, which can include pre-configured HTML pages, via JavaScript executed on the remote web browser 37. Alternatively, the variable data can be accessed from a remote client web browser 37 at a web-enabled remote robot 21, PLC 27, networked welder 10, computer 31 or other device. The variable data provided in the weld parameters library can then be retrieved through an HTML script or other program running at the web-enabled remote device 37, and, as established by the HTML script, selective weld feedback and weld component state parameters can be viewed remotely. Additionally, the HTML script can selectively provide control of the weld control command parameters and weld component controls from the remote device 37.

High speed data exchange, as for, example, for communications with remote devices 37, is carried out through Javascript XHTTP requests, and the appropriate server extensions respond to the requests by returning requested data in JSON or XML format. Requests to the server 33 and all response from the server 33 are given an ordering number so that under high data loss conditions on the most recent data is used.

As discussed above, data can be retrieved from welding system 10 either by viewing web pages with variable data from the server extensions included or by downloading generated log or configuration files directly. Data is transmitted to the welding system 10 either via HTTP queries or by uploading files. Although a web server 33 is described here, in addition to or as an alternative to a web server 33, the communications system 30 can include a serial communications link such as DeviceNet, Profibus, RS-232 or other communications systems, or through a network communications device such as an Ethernet connection, or other wired or wireless communication devices.

Referring again to FIG. 1, the controller 16 can include one or more microcontroller, microprocessor, digital signal processor, or other programmable controller, along with an internal or external memory component 18, capable of storing weld configuration data, welding programs and procedures specified by the user. The controller 16 may also be connected to a user interface 32, which can be mounted in the housing 11, or provided external to the housing 11 and welding system 10, and can include a user display and input devices, such as keys, switches, joysticks, analog or digital potentiometers, or other devices to provide information to and receive information from an operator or user of the welding system 10.

Referring still to FIG. 1, the welding system 10 can also include an input/output board (I/O board) 17, which provides connection points for external equipment to both provide input signals to the welding system 10 and to receive discrete outputs from the welding system 10. The inputs and outputs can include, among other indicators, welding process state conditions and error conditions. Common welding process state condition signals input and output through the I/O board 17 can include, for example, contactor on (weld on), gas valve on (purge), wire feed motor foreword (jog), wire feed motor reverse (retract), weld program selection, and touch sense detect. Common error conditions can include, for example, voltage sense error, arc start error, wire stick errors, motor over current errors, coolant flow errors, or gas flow errors. Analog input and output signals, including voltage command and feedback, wire feed command and feedback, and current feedback can also be provided on the I/O board 17. Welding state data, error data, feedback and command data can also be transmitted to and from the welding system 10 through communications system 30 discussed above, and by access to a weld parameter library as described above.

Referring still to FIG. 1, the welding system 10 is connected to an input power supply line 15, typically a three phase supply, which provides power both for the control circuitry and for the power supply 12. Voltage and current sensors (not shown) can be provided on the input power supply line to allow the power to power supply to be monitored, typically by controller 16. The welding power supply 12 is preferably an inverter power system, and can be a constant voltage power supply or a constant voltage/constant current power supply, and preferably includes pulsing capabilities, providing the ability to perform MIG(GMAW) welding, pulsed MIG(GMAW P) and flux-cored (FCAW) welding.

Referring still to FIG. 1, the controller 16 of welding system 10 is further connected to external welding components including a wire feed system 20, a gas valve 23, and, optionally, a coolant system 25. The wire feed system 20 includes a motor 19 that drives wire through drive rolls and a liner to a torch or gun 13 including a contact tip. The gas valve 23 can be either an on/off valve, a metered valve controlled by controller 16, or can include a separate or integral flow meter. Similarly, when a coolant system is provided, the system can include an on/off or metered valve, and flow metering devices.

Optionally, the welding system 10 can also be connected to external input and output signals provided, for example, by components in a welding cell. The fixtures 29, for example, can include devices such as clamps for maintaining a work piece 14 in position during a weld, and preferably also include sensing devices, such as devices for providing a signal to the controller 16 when associated clamps either open or close, and proximity sensors for sensing a position of the work piece 14 in the fixture 29 or a position of a welding torch approaching the work piece 14. Additionally, a series of light emitting diodes, laser diodes, or other lighting elements can be provided in the fixture either to illuminate an area to be welded for the operator, or to provide an indicator to the operator. The indicator can, for example, indicate which in a series of welds is to be performed, providing a sequence for the operator. Lighting and other visual aids can also be used to indicate when a welded part is complete. Audio-producing devices, such as buzzers and horns, can also be associated with the fixture to provide a signal to an operator or supervisor when a weld is complete, when an error has occurred, or in various other situations. These devices can be connected directly through the communications system 30, or through an external device such as the PLC 27, robot 21, a remote computer system, or other controller.

The welding system 10 can be used in various modes of operation, including both semi-automatic and automatic welding. Weld command parameters can be stored as pre-programmed weld procedures in memory 18 or provided to the weld system 10 through communications system 30, or selected through inputs to the I/O board 17. External devices, such as a handheld gun or torch or other device with a trigger switch, a robot controller associated with robot 21, PLC 27, or a remote system and display such as a externally connected PC, can provide a signal to the controller of the welding system 10 to start the weld. The weld parameter commands can be retrieved from memory 18, or be provided from the robot 21, PLC 27, or other external device through communications system 30.

In operation, the controller 16 receives a trigger signal as described above and commands the power supply 12 to provide welding current and voltage to start an arc at the work piece 14. Command levels for controlling the weld can be set and stored internally in memory 18, or can be received from the external components, such as robot 21 and PLC 27, or other controllers or computers as discussed above, either in the form of analog or digital control signals. Based on the input commands, the controller 16 also commands the wire feed system 20 to drive filler metal from the motor 19 to a contact tip in torch 13, providing wire to the weld at the work piece 14. The controller 16 also controls the gas valve 23 to selectively provide shielding gas to the weld. Depending on the type of gas valve used, the controller 16 can provide a simple on/off signal, or control the level of flow from the valve 23.

During operation, the controller 16 receives feedback from a voltage sensor 26, a current sensor 28, and a wire feed speed sensor or tachometer 24, and can also optionally monitor gas flow through a gas flow sensor associated with the gas valve 23, and coolant flow in coolant system 25. The feedback data is used by the controller 16 to control the power supply 12, wire feed system 20, and gas valve 23. Additional feedback data can also be provided from external components. This data can include, for example, travel speed of the torch, proximity sensor input data, clamp closure data, and other data. The controller 16 can also monitor input voltage and current levels from input power lines, and provide feedback data relate to these values, as well as average motor voltage and current values.

Figure 3:
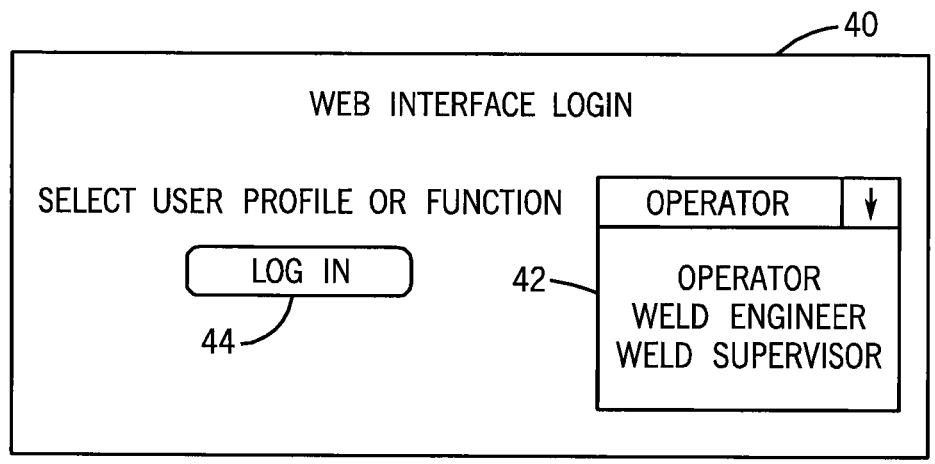
FIG. 3 is screen shot illustrating a web interface login screen for accessing the welding system of FIG. 1 from a remote browser.

Referring again to FIG. 2 and now to FIG. 3, as described above, the welding system 10 can include a remote operator interface server extension 45 which allows weld parameter controls and commands for welding system 10 to be provided from a web browser 37 at a web-enabled remote device such as a robot 21, PLC 27, a network of welding systems 10, or remote computer system or server 31, and enables both control and monitoring function from a remote location. This remote operator interface, moreover, can be customized to provide access to the control, command, diagnostic, and display data selected by a user, and therefore to customize the display either for a specific function, or for a specific user.

To access the remote control interface from a remote device, the user activates the web browser 37 at the remote interface and accesses a web interface login screen 40, constructed using data from the static files 43 and dynamically generated source files 41 described with reference to FIG. 2, above, from the embedded web server 33. The interface login screen 40 prompts the user to select a user profile from a drop down menu 42. As shown here, the access levels include an operator access level, weld engineer access level, and a weld supervisor access level.

After the user profile is selected through the drop down box 42, the user activates icon 44 to log in to the system, and is prompted to provide identification (not shown). The identification can be a user name and password, or an electronic or mechanical key, such as an RFID token, or biometric authentication. For purposes of this description, the user is assumed to have chosen the "weld engineer" user profile and to have logged into the system. When logged in as either an operator or weld supervisor, however, the user would be provided with fewer or different options for configuring the system than as described below.

Figure 4:
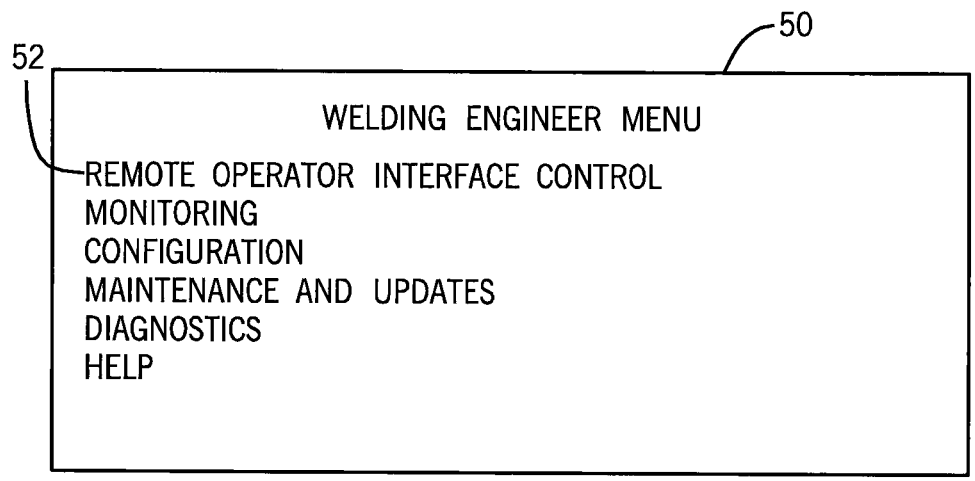
FIG. 4 is a screen shot illustrating a top level menu for accessing a remote operator interface and remote operator interface configuration, along with other functions, for use in the welding system of FIG. 1.

Referring now to FIG. 4, after the password or other identification is accepted, the user accesses a main interface menu 50. From the main interface menu 50, the user can select between a number of different links, including a remote operator interface control link 52, a monitoring link, a configuration link, a maintenance and update link, and a diagnostic link.

Figure 5:
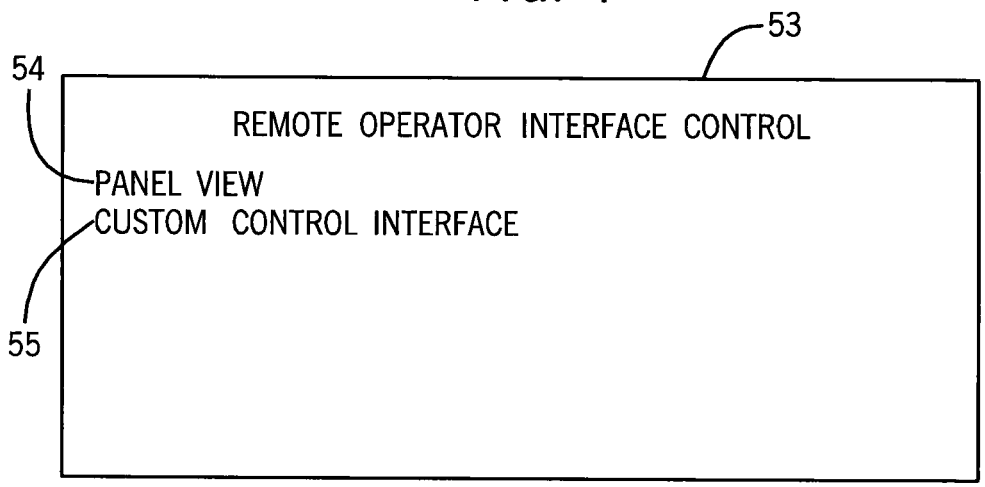
FIG. 5 is a screen shot illustrating a first screen for selecting a remote operator interface.
Figure 6:
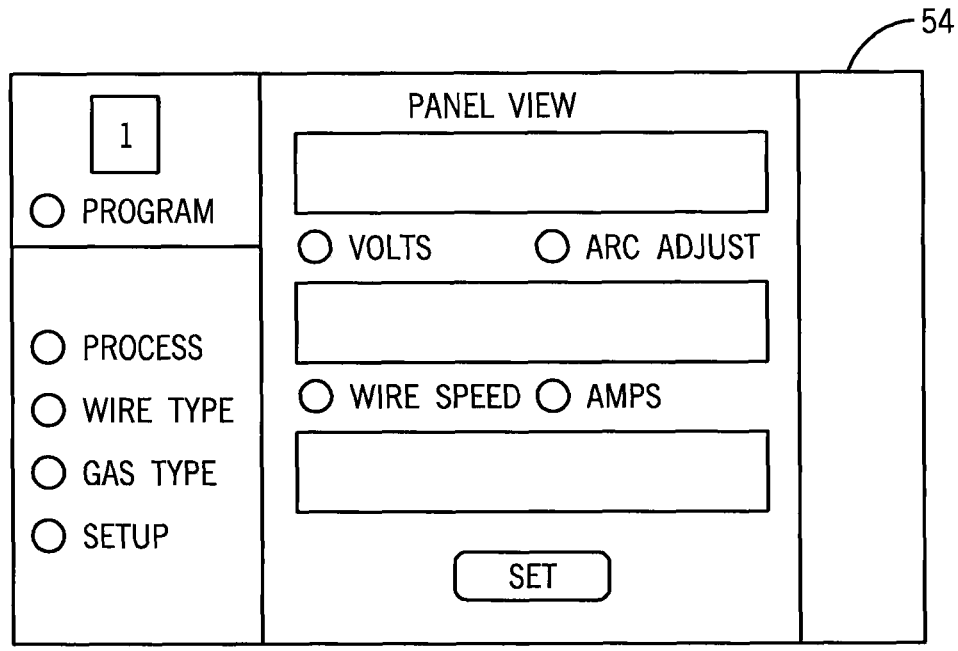
FIG. 6 is a screen shot illustrating a remote panel view as seen from a remote web browser.

Referring now to FIG. 5, when the remote operator interface control link 52 is selected, a display screen 53 is provided allowing the user to select between a panel view 54 and a custom control interface 55. Referring now to FIG. 6, the panel view 54 provides a virtual panel display which is configured in the same manner as a display provided, for example, on a user interface 32 associated with the welding system 10. Here, fairly simple control and display options are provided. The user can select a weld program, select a process, wire type, and gas type, and can view and adjust voltage, arc adjust, wire speed, and amps.

Referring again to FIG. 5, when the user instead selects the custom control interface link 55, the user is provided with the option to customize a weld interface that can be operated from a web browser 37 and that provides access to a selected number and type of functions. By way of example here, the functions available for configuration on the remote display are categorized as display, control, diagnostic, and command functions. The "display functions" allow the user to monitor and display current welding conditions by displaying welding parameter values such as, for example, an actual voltage, current, and wire feed speed during a weld, as well as a selected weld process or weld program. The user can also opt to display the command values provided to the welding system 10, including a voltage/trim command, a wire feed speed command, and an arc adjustment or inductance command. "Command functions" allow a user to establish a command value from a welding process from a range of available values for controlling the power supply 12 and wire feed system 20 of the welding system 10 from the remote interface, and again, specifically allow adjustment of a voltage/trim command, a wire speed command, and an arc adjustment or inductance command. The "command functions" can also allow for selection of a weld program or a weld process from the interface from among a number of available options. The "control functions" provide on/off controls at the welding system 10 from the remote interface and can include, for example, a trigger or start/stop weld function, and purge, jog, and retract controls, which selectively activate the gas valve 23 and motor 19 in a forward or reverse direction.

"Diagnostic functions" allow the user to monitor parameters that can be indicative of weld or welding equipment malfunction as, for example, a current and voltage produced by the motor 19, and the level of the input power line connected to the welding system 10. Diagnostic data displayed at the remote interface can also include error data, such as a voltage sense error, an arc start error, wire stick errors, motor over current errors, coolant flow errors, or gas flow errors, and weld state data, such as contactor, jog, retract, remote program selection, standby and E-stop states. These errors are determined by the controller 16 in a manner known to those in the art.

Although specific functions are shown and described here, it will be apparent that these functions are by way of example only, and that a user-configured interface could include any number of display, control, command, diagnostic, and other functions. For example, from a remote interface, a user could also adjust timed parameters, such as pre-flow, post-flow, arc start delay, and burn back. Additionally, functions useful in setting up replacement equipment in a cell, such as a "robot type" and a "dry run" selection could also be configured on a remote user interface to enable activation of these functions. "Other" functions, such as an option of enabling a camera to visually monitor a weld in progress, can also be provided.

Figure 7:
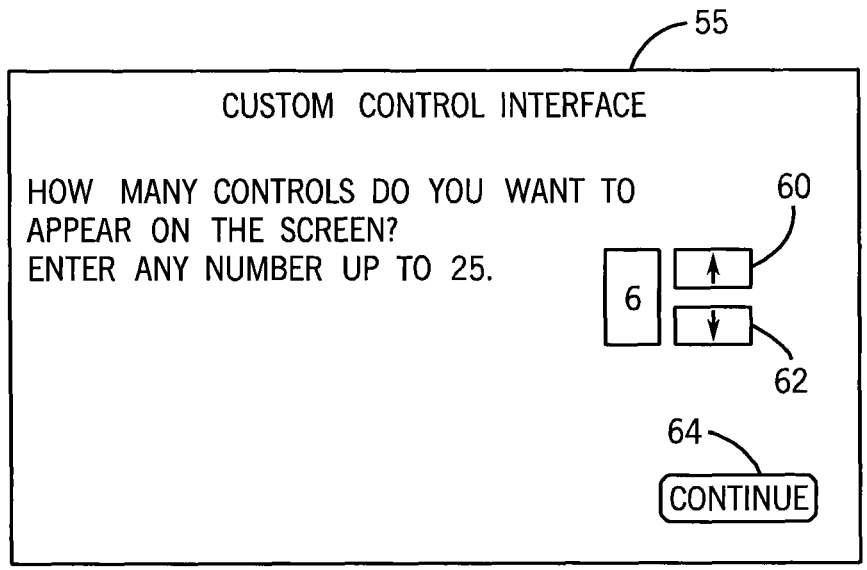
FIG. 7 is a screen shot illustrating a first selection screen for establishing a customized remote interface.

Referring now to FIG. 7, from the custom control interface screen 56, the user initially selects a number of functions to be displayed on the customized interface by activating up/down operational controls 60 and 62. When satisfied with the selected number, the user selects a "continue" icon 64. By way of example here, twenty-five functions are available. However, it will be apparent that any number of functions could be provided, and that the number of functions can be varied based on the size of the display at the remote interface, the access level of the user, and many other variables. The access level, for example, can be used to increase or decrease the number of functions available to a user. Thus, for example, an operator might be provided with six available options, a supervisor with fifteen, and a weld engineer with twenty-five.

Figure 8:
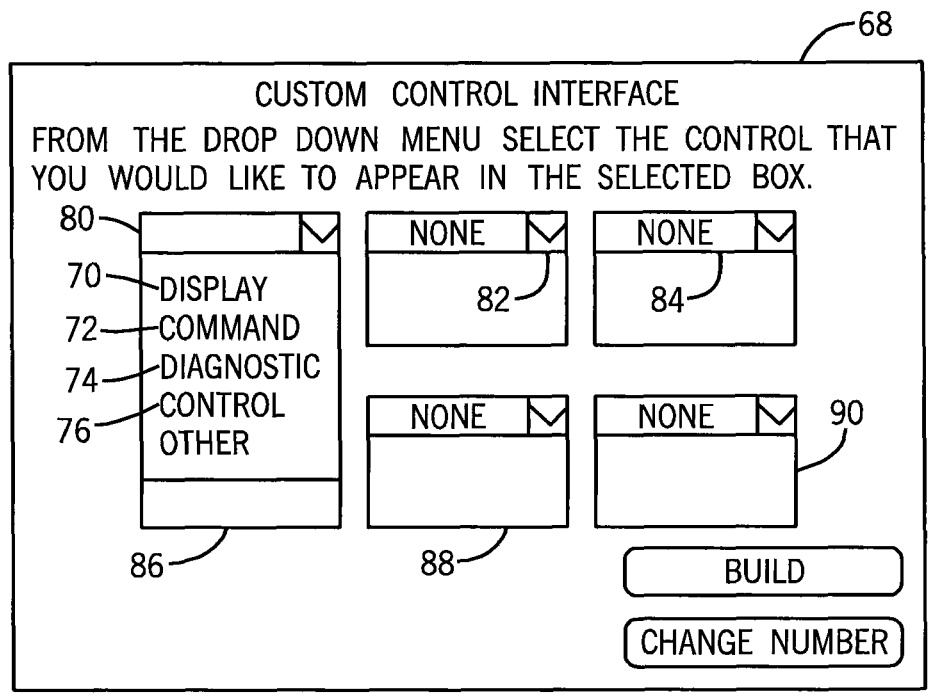
FIG. 8 is a screen shot illustrating the steps for establishing a custom interface.

When the save icon 64 is selected from screen 56, an interface configuration screen 68 is displayed, as shown in FIG. 8. Here, an interface box 80, 82, 84, 86, 88, and 90, is provided on screen 68 for each of the 6 functions selected above, and the user is presented with a drop down menu allowing the user to select between the different categories of functions described above. Specifically the user is prompted to associate each interface box on the remote screen with a selected display 70, control 76, diagnostic 74, or command 72 function category. An "other" category, 72, or other functions, such as timing and set-up functions, can also be provided as described above. The functionality of the interface box will vary depending on the selected category. Thus, for example, a command function will provide both a data display and a user interface that will allow a user to input a selected command value, while a display interface box provides only the ability to display a value, and a control interface only an an/off activation user interface control.

Figure 9:
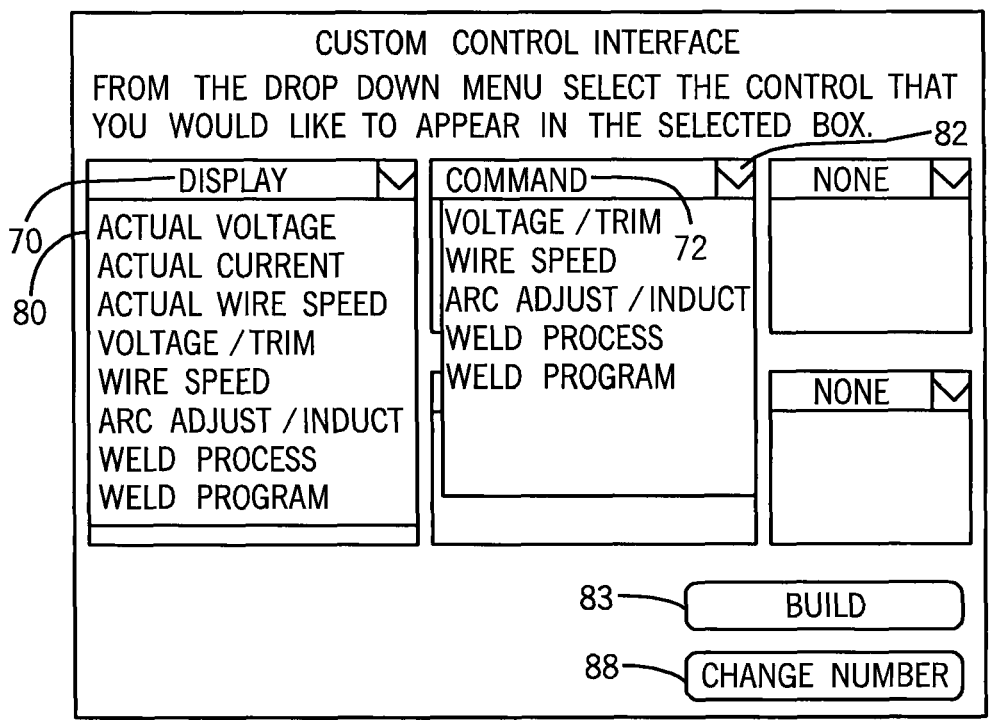
FIG. 9 is a second screen shot illustrating the steps for establishing a custom interface.

Referring now to FIG. 9, after a category is selected for an interface box, the user is presented with another drop down menu, allowing the user to identify a specific function for the interface box within the selected function category. As shown here, in the display category 70, the user can elect to display an actual voltage, an actual current, an actual wire speed, an actual weld program or a weld process in the selected box. The user can also elect to monitor a command value, such as a voltage/trim command, wire feed command, and arc adjust/inductance command. In the command category 72, the user is prompted to select between voltage/trim, wire speed, arc adjust, inductance, or a weld process or weld program, as described above, and can adjust the selected values from the remote interface. Here, user inputs would be associated with the interface box to allow a user to adjust a value, or select between a list of functions. As described above, these inputs could be hardware inputs associated with an existing keyboard or keys, joysticks, etc., or provided as touch screen or mouse-driven icons. Various methods of providing inputs will be apparent to those of skill in the art. In alternate embodiments of the invention, the user could also select an input device to associate with selected input boxes from, for example, a menu.

Figure 10:
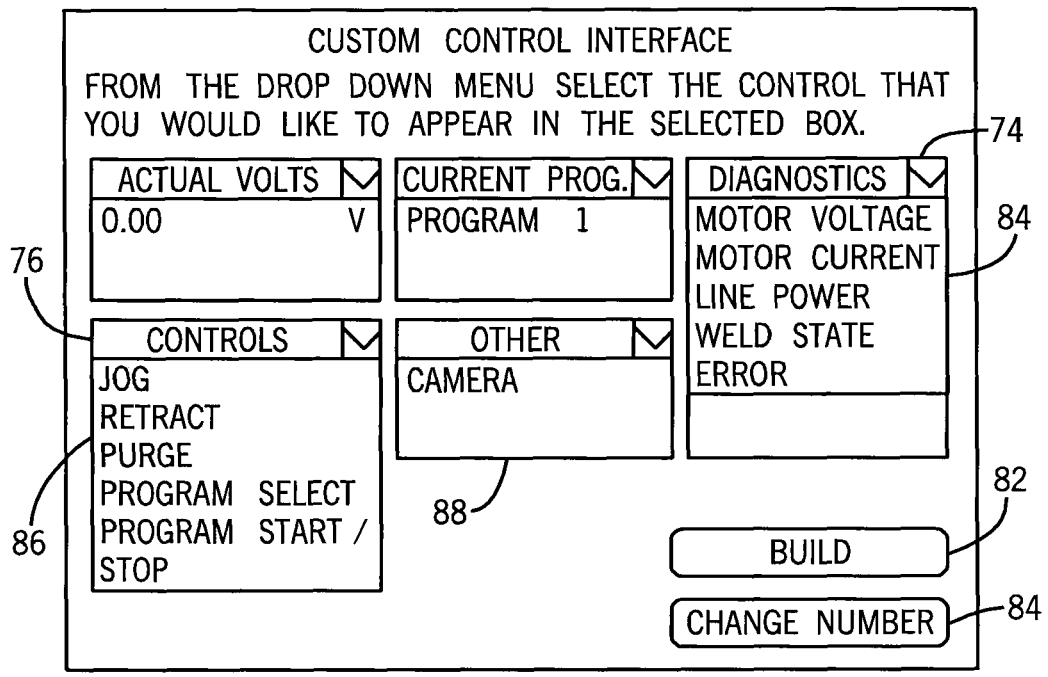
FIG. 10 is a screen shot illustrating the customization process just prior to completion.

Referring now to FIG. 10 when the diagnostic category 74 is selected, the user can select to display a motor voltage or a motor current, and to monitor a line power in the facility in which the welding system 10 is operating. The motor parameters can be monitored, for example, to identify and diagnose problems in the wire feed system. Input line power, similarly, can be monitored to determine both the input level of the power, and fluctuations that might cause problems in the output of the power system 12. As described above, the diagnostic category 76 can also allow a user to display welding state data (contractor, jog, restart, pause) and error data (wire stick, arc start error, etc.)

Referring still to FIG. 10, in the control category 76, the user can select a jog, wire retract, purge control, and a program start/stop control. As each of these functions require a user to provide an input, for the control category 76 the interface boxes are associated with an input device which can be, for example, an icon on a touch screen, a key dedicated from a keyboard, a mouse activated icon, or various other input devices, as will be apparent to those of skill in the art.

After each of the selected boxes is associated with a specific function, the user selectively activates the build icon 83. When the build icon 83 is activated, the screen configuration data is saved in a JavaScript which can be stored either as a URL for the page, in a cookie stored on the client browser 37, or in a database stored in memory 18 associated with the web browser 33 in the welding system 10. Alternatively, if additional functions are desired, the user can select the change number icon 85 to add additional functions to the display.

Figure 11:
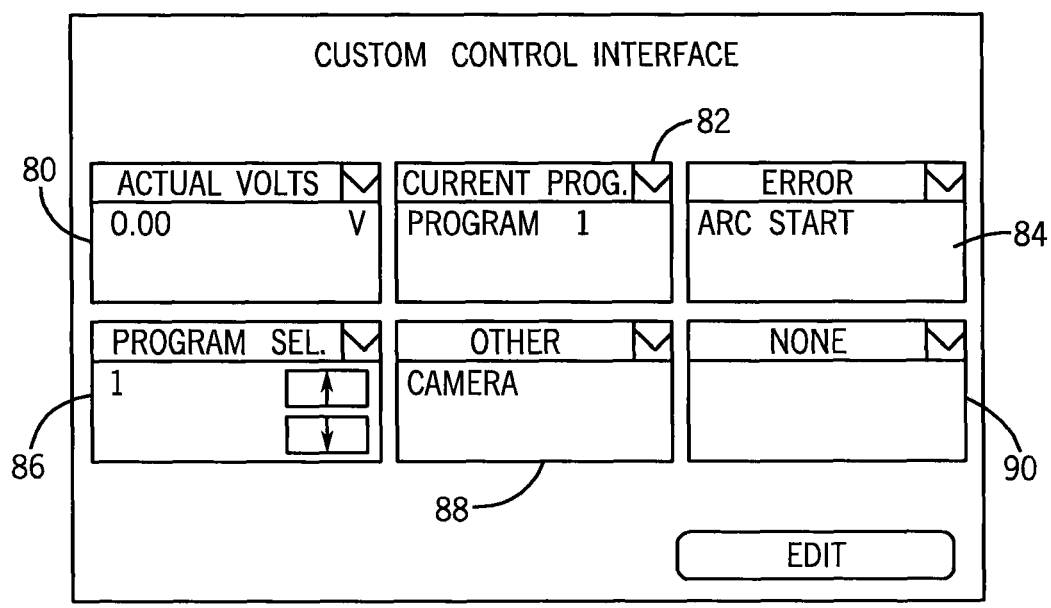
FIG. 11 is a screen shot illustrating a customized interface after completion.

Referring now to FIG. 11, after the "build" function is completed, the selected command, diagnostic, control and other functions are all provided on the screen 86. In the example shown here, the user can view the actual voltage and current program, monitor the current program and error status, and select a program.

The present invention therefore provides a significant advantage over the prior art by providing a highly flexible display system. By selecting the types of data to be displayed on the screen and the available controls, specific functions can be customized, and various levels of control can be provided. Thus, for example, customized displays could be provided for operators at varying training levels. For an inexperienced operator, for example, the controls could be limited to a weld program selection and a start/stop control, and all other controls could be disallowed. For a more sophisticated operator or a supervisor, the display could provide access to control a voltage and wire feed command level, and provide monitoring functions including actual voltage and wire feed speeds.

A remote display screen could also be customized to allow a supervisor or other personnel to monitor a weld from a remote location. Here, for example, display parameters such as voltage and wire feed speed feedback could be monitored, in conjunction with error data. Additionally, to troubleshoot problems with the welding equipment, a user could establish customized screens providing specific sets of display and control functions. Thus, for example, to troubleshoot a wire feed problem, a user could elect to control a jog and a retract function, to monitor wire feed speed command, actual wire feed speed feedback, motor voltage and current, and monitor a wire feed relay.

Additionally, screens could be customized to simplify equipment replacement. Here, for example, a screen could be provided with a robot type selection, a dry run control, and purge, jog and retract switches. These controls would allow a user to associate the connected welding system 10 with an appropriate robot 21, and to verify operation of the gas valve 23 and motor 19 when setting up a weld cell. As these various remote operator interfaces are constructed, they can be bookmarked or saved as a favorite, and then recalled when needed.

Although, as described above, in one aspect of the invention, the user accesses pre-configured web screens 40, 50, 53, 54, 55, and 68 from a remote web browser 37 to provide a pre-configured display, a user can also configure remote control and command screens at remote web browsers 37 through customized html scripts or other programs running on the remote web browser. These programs can, for example, access the functions provided in a weld parameter library, discussed above with reference to FIG. 2, and provide controls for commanding the power supply 12, wire feed system 20, gas valve 23, coolant 25, or externally connected devices such as the robot 21, PLC 27, or other hard automation components. In addition, through access to the weld parameter library, html scripts at the web browser 37 can access weld feedback and weld state parameter data and display this data. Alternatively, a user could monitor the data, or combine feedback and state parameters, to establish self-configured error conditions or alarm conditions. As discussed above, through access to available weld control and feedback parameters, the user can configure specific screens and provide specific access for various levels of users.

Referring again to FIG. 4, when using the pre-configured screens provided through web server 33, various other functions are available to the weld engineer from the main menu 50, as discussed above, including a monitoring link, configuration link, and a diagnostic link. When the monitoring link is selected, the user can, for example, view weld data and summaries, access monitoring logs, and download weld wave form data.

From the configuration link, the user can edit welder configuration data and save this data to a PC or upload the data from a PC. Configuration data accessed from this screen can include, for example, provide access to activate or deactivate a number of different errors including a voltage sense error, an arc start error, arc run time errors, wire stick errors, motor over current errors, coolant flow errors, or gas flow errors. Additionally, the configuration screen can provide locks to allow a supervisor to either selectively or globally lock access to weld programs or functions.

The maintenance link can provide a system back up and recovery options, and software update options. In the diagnostic screen the user can view and clear an error log, view the states of various inputs and outputs including, for example, the contactor, jog, retract, remote program selection, e-stop, wire feed and voltage outputs including current detect, standby, error modes, wire stuck errors, coolant errors, touch sense errors, voltage feedback and current feedback can be viewed. From this screen the user can also control the contactor, the gas valve, and the motor in both the forward and reverse direction in order to verify the operation of the contactor and any purge functions and jog functions. From the diagnostic screen, the user can also download current status and debugging information, and email the data to a service center for assistance with troubleshooting.

It should be understood that the methods and apparatuses described above are only exemplary and do not limit the scope of the invention, and that various modifications could be made by those skilled in the art that would fall under the scope of the invention. For example, while functions are provided in various category types above, and the selection process is described as including a category selection and a function selection it will be apparent that all available functions could be displayed to a user at one time, and the user could select between the displayed functions rather than selecting by function category as described above. Alternatively, a function look-up display could be provided, or the various functions could be provided on a menu.

Furthermore, while a specific set of screens is described above, it will be apparent that these screens are provided by way of example only, and that the described functions could be implemented in a number of different ways, and in various configurations. Additionally, although specific data types are described with reference to each of the screens described above, it will be apparent that the data could be configured in any number of ways.

Furthermore, although the embedded web server is shown above as provided internal to a housing of the welding power supply, it will be apparent that the server could be provided in an external housing, or provided in a housing elsewhere within the welding system.

To apprise the public of the scope of this invention, the following claims are made:

What is claimed is:

1. A welding system comprising:
    a power supply producing weld power;
    a welding controller coupled to the power supply to provide weld parameter control signals to the power supply; and
    an embedded web server in communication with the welding controller and a remote client browser, the embedded web server being programmed to provide an interface to a user accessing the remote client browser to customize a remote weld interface by:
        selecting one or more weld control for inclusion on the remote weld interface,
        identifying at least one of a display, control, and command function category for each selected weld control, the selected category correlating the weld control with at least one of a display, control and command function for displaying, commanding and controlling weld parameters from the customized remote weld interface, and
        building the customized remote weld interface at the remote client browser, the customized remote weld interface providing access to the selected weld interface controls for monitoring and controlling the welding power supply,
    wherein the user can selectively activate weld functions, control and adjust the output of the welding power supply and display the selected weld parameters from the customized remote weld interface at the remote client browser and save one or more customized remote weld interface for recall from the remote client browser or another browser.

2. The welding system of claim 1, further comprising a wire feed control including a motor coupled to the controller for driving a wire into a weld, and wherein the embedded web server is further programmed to provide a customized operator interface for monitoring and controlling the wire feed control.

3. The welding system of claim 1, wherein the display function allows a user to selectively display at least one of actual voltage, an actual current, an actual wire speed, an actual weld program, a weld process type, a voltage/trim command, a wire feed command, and an arc adjust/inductance command value.

4. The welding system of claim 1, wherein the control function allows a user to selectively activate at least one of a trigger weld function, a purge, a jog, and a retract control.

5. The welding system of claim 1, further comprising a diagnostic function, and wherein the diagnostic function allows a user to selectively display at least one of a motor current, a motor voltage an input power line level, a voltage sense error, an arc start error, a wire stick error, a motor over current error, a coolant flow error, and a gas flow error.

6. The welding system of claim 1, further comprising a diagnostic function, and wherein the diagnostic function allows a user to selectively display at least one of a contactor state, a jog state, a retract state, a program state, a standby state and an E-stop weld state.

7. The welding system of claim 1, wherein the command function allows a user to selectively display and adjust at least one of a voltage/trim command, a wire speed command, and an arc adjustment/inductance command.

8. The welding power system of claim 1, wherein the embedded web server is further programmed to build a customized interface by constructing a program to provide the customized interface at the remote interface using a scripting language added to HTML to create interactive documents for the selected functions.

9. The welding system of claim 1, wherein the web server is further programmed to receive an identity of the user and to display one or more of the plurality of functions for displaying and controlling weld parameters depending on a level of security associated with the identity of the user.

10. The welding system of claim 1, wherein the remote interface provides a readout display for each selected display function and each selected diagnostic function, and one or more user input for the selected control functions and the selected command functions.

11. The welding system of claim 1, wherein the remote client browser is provided in at least one of a computer, a teach pendant for a robot, and an interface for a programmable logic controller.

12. The welding system of claim 1, wherein the embedded server is programmed to dynamically generate web pages created by web server extensions running on the embedded web server.

13. The welding system of claim 1, further comprising a memory component storing static data accessible to the dynamically generated pages.

14. The welding system of claim 1, wherein the embedded web server further comprises a library of weld parameters that are accessible from the remote client browser to provide access to weld command parameters, weld component control commands, and weld component state parameters, and weld feedback parameters to allow an external program to selectively control weld commands and receive and display weld feedback.

15. The welding system of claim 1, wherein the interface comprises a display screen providing a user access to select a number of controls to be displayed in the interface, provides a menu for the user to designate each of the controls to provide a display, a control, a diagnostic, or a command function, and provides a build command for building an interface display when the controls are designated.

16. The welding system of claim 8, wherein the program providing the customized remote interface is stored in at least one of a URL for the page, a cookie stored in a memory component of the remote client browser, or in a database in a memory associated with the web server in the welding power source.

17. The welding system of 13, wherein the static data comprises at least one of an HTML web page, a cascading style sheet document, an image file and a JavaScript source code document.

18. A method for providing a customizable remote weld interface for a welding power source and associated wire feed system having an embedded web server, the method comprising the following steps:
    communicatively coupling an embedded web server to a weld controller of the welding power source;

programming the embedded web server to provide selective access to weld control functions in the welding power source for providing at least one of a display, a control, and a command function from a customized remote weld interface at a remote client browser;

providing access to the embedded web server from the remote client browser, wherein an operator at the remote client browser selectively chooses among the weld control functions for inclusion on the customized remote weld interface providing access for the user to display, control and command weld control functions from the remote weld interface at the remote client browser and to build the customized remote weld interface including the selected weld control functions, wherein the customized remote weld interface is accessible to a user to selectively activate, adjust and display the selected weld control functions from the customized remote weld interface during and between welds; and selectively storing the customized remote weld interface for recall from at least one of the remote client browser or another browser.

19. The method as recited in claim 18, wherein the step of programming the embedded weld web server comprises dynamically generating pages created by web server extensions running on the embedded web server.

20. The method as recited in claim 18, wherein the step of selectively choosing a display function comprises providing access to a user to select between a display of at least one of an actual voltage, an actual current, an actual wire speed, an actual weld program, a weld process type, a voltage/trim command, a wire feed command, and an arc adjust/inductance command value at the remote browser.

21. The method as recited in claim 18, wherein the step of selectively choosing the control function comprises providing access to an operator at the remote client browser to selectively activate at least one of a trigger weld function, a purge, a jog, and a retract control.

22. The method as recited in claim 18, wherein the step of selectively choosing the command function comprises providing access to an operator at the remote browser to selectively display and adjust at least one of a voltage/trim command, a wire speed command, and an arc adjustment/inductance command.

23. The method as recited in claim 18, further comprising the step of allowing access to a display function.

24. The method as recited in claim 19, wherein the step of programming the embedded web server comprises storing static data accessible to the dynamically generated pages in a memory component in the welding power source.

25. The method as recited in claim 20, wherein the static data comprises at least one of an HTML web page, a cascading style sheet document, an image file and an interactive document created using a scripting language added to HTML.

26. A welding system comprising:
a power supply producing weld power;
a weld controller coupled to the power supply to provide weld parameter control signals to the power supply; and
an embedded web server in communication with the weld controller and a remote client browser, the embedded web server being programmed to:
provide a library of weld control functions for displaying, commanding and controlling weld parameters, the library being accessible to a user at the remote client browser
provide the user access to select display, command, and control functions in the library of control functions for inclusion on customized remote weld interface from the remote client browser, each of the selected display, command, and control functions providing at least one of a data display and a user input function, and
build a customized remote weld interface at the remote client browser for receiving user weld control and weld commands and displaying weld feedback for monitoring and controlling the power supply,
wherein the user can selectively control, command, and display weld parameters from the customized remote weld interface at the remote client browser and save one or more customized remote weld interface for recall from the remote client browser or another browser.

27. The welding system of claim 26, wherein the display function allows a user to selectively display at least one of actual voltage, an actual current, an actual wire speed, an actual weld program, a weld process type, a voltage/trim command, a wire feed command, and an arc adjust/inductance command value.

28. The welding system of claim 26, wherein the control function allows a user to selectively activate at least one of a trigger weld function, a purge, a jog, and a retract control.

* * * * *